(12) United States Patent
Sacherman et al.

(10) Patent No.: US 8,281,709 B2
(45) Date of Patent: Oct. 9, 2012

(54) INDOOR RANGE-TOP GRILL

(75) Inventors: Jim Sacherman, Genoa, NV (US); Chan Yin Ho, San Chung (TW); Chen Chien Cheng, Taipei (TW)

(73) Assignee: Headwater Holding Company Ltd. (KY)

( * ) Notice: Subject to any disclaimer, the term of this patent is extended or adjusted under 35 U.S.C. 154(b) by 121 days.

(21) Appl. No.: 12/862,652

(22) Filed: Aug. 24, 2010

(65) Prior Publication Data

US 2011/0252977 A1 Oct. 20, 2011

Related U.S. Application Data

(63) Continuation-in-part of application No. 12/378,410, filed on Feb. 13, 2009.

(60) Provisional application No. 61/066,007, filed on Feb. 14, 2008.

(51) Int. Cl.
*A47J 37/07* (2006.01)

(52) U.S. Cl. ............... 99/447; 99/449; 99/450; 99/401

(58) Field of Classification Search ............ 99/401, 99/400, 447, 446, 449, 450; 126/275 R See application file for complete search history.

(56) References Cited

U.S. PATENT DOCUMENTS

| | | |
|---|---|---|
| 100,410 A | 3/1870 | Hull |
| 514,079 A | 2/1894 | Jehu |
| 701,305 A | 6/1902 | Daughtry |
| 884,178 A | 4/1908 | Cowhig |
| 884,718 A * | 4/1908 | Cowhig ................ 99/375 |
| 1,036,148 A | 8/1912 | Reina |
| 1,685,829 A * | 10/1928 | Sauvage .............. 126/275 R |
| 1,711,631 A | 5/1929 | Burnett |
| 1,758,658 A | 5/1930 | Fisher |
| 1,862,420 A | 6/1932 | O'Brien |
| 2,099,788 A | 11/1937 | Ames |
| 2,374,749 A | 5/1945 | Howard |
| 2,641,246 A | 6/1953 | Guthof |

(Continued)

FOREIGN PATENT DOCUMENTS

GB 2270459 A 3/1994

OTHER PUBLICATIONS

Office action dated Dec. 13, 2011, U.S. Appl. No. 12/378,410, filed Feb. 13, 2009, applicant: Jim Sacherman, 18 pages.

(Continued)

*Primary Examiner* — Reginald L Alexander
(74) *Attorney, Agent, or Firm* — Haverstock & Owens LLP

(57) ABSTRACT

An indoor range-top grill allows a user to substantially duplicate outdoor grilling indoors. In some embodiments, the indoor range-top grill sits on top of a gas or electric burner of a stove and uses heat from the burner to grill and cook food. Typically, the indoor range-top grill comprises a grill enclosure having an opening at a top and a hole at a bottom, a burner shield positioned inside the grill enclosure, an optional cone positioned above the burner shield, a grate positioned above the cone, and an optional separator configured to position the grill enclosure thereon. In some embodiments, the burner shield comprises a heat director integrally coupled to a grease ring. The grease ring typically guides food residue away from the hole, trapping the food residue between the grease ring and the grill enclosure.

22 Claims, 9 Drawing Sheets

U.S. PATENT DOCUMENTS

| | | | |
|---|---|---|---|
| 2,722,883 A | 11/1955 | Rignell | |
| 4,320,736 A | 3/1982 | Sharon | |
| 4,388,743 A | 6/1983 | Hellinger et al. | |
| 4,430,559 A * | 2/1984 | Rabay | 219/449.1 |
| 4,694,816 A | 9/1987 | Fabbro | |
| 5,044,352 A | 9/1991 | Lok | |
| 5,431,091 A * | 7/1995 | Couture | 99/401 |
| 5,473,980 A * | 12/1995 | Carpenter | 99/446 |
| 5,555,795 A | 9/1996 | Tsai | |
| 5,682,873 A | 11/1997 | Chambers | |
| 5,934,180 A | 8/1999 | Lin | |
| 6,024,082 A | 2/2000 | Straubel et al. | |
| 6,112,372 A | 9/2000 | Zhou et al. | |
| 6,131,505 A | 10/2000 | Lin | |
| D447,000 S | 8/2001 | Knowles | |
| D451,333 S | 12/2001 | Hsu | |
| 6,782,801 B1 | 8/2004 | Correa et al. | |
| D517,853 S | 3/2006 | Mata, Jr. | |
| 7,059,318 B2 | 6/2006 | Cornfield | |
| 2006/0011192 A1 | 1/2006 | Citrynell et al. | |
| 2007/0175467 A1 | 8/2007 | Liu | |
| 2007/0277807 A1 | 12/2007 | Taban | |
| 2008/0141869 A1 * | 6/2008 | Ikeda | 99/447 |
| 2009/0199841 A1 | 8/2009 | Tsung | |

OTHER PUBLICATIONS

Office action re: U.S. Appl. No. 12/378,410, Stephen Francis, mail date: Oct. 7, 2011.

* cited by examiner

INDOOR RANGE-TOP GRILL

CROSS REFERENCE TO RELATED APPLICATIONS

This patent application is a continuation in part of the co-pending U.S. patent application Ser. No. 12/378,410, filed Feb. 13, 2009, entitled "Indoor Range-Top Grill," which is hereby incorporated by reference.

The U.S. patent application Ser. No. 12/378,410 claims priority under 35 U.S.C. §119(e) of the U.S. Provisional Patent Application Ser. No. 61/066,007, filed Feb. 14, 2008, and entitled "Indoor Range-Top Grill," which is also hereby incorporated by reference.

FIELD OF THE INVENTION

The present invention relates to grills. More particularly, the present invention relates to the indoor range-top grill.

BACKGROUND OF THE INVENTION

Outdoor grilling is a popular method of cooking food. Approximately 75% of U.S. households have an outdoor grill. Attempts to grill indoors using the outdoor grill occur often. However, using the outdoor grill indoors is dangerous because the outdoor grill are not designed for indoor use. Indoor grilling must be done on a grill specifically designed for use indoors.

Currently, there are two types of products that exist in the art that allow a user to "grill" indoors. A first type is a grill pan that has a grilling platform with ridges. The grill pan is used on a stove. The ridges on the grill pan allow the user to make "grill" marks on the food. A second type is an electric grill. The electric grill is similarly configured as the grill pan but is electric. Although prior art indoor grills allow the user to grill indoors, they suffer from a number of shortcomings. For example, the prior art indoor grills do not add true BBQ taste/flavor to the food since the user is not actually grilling. In addition, since some prior art indoor grills are electric powered and have electric cords and controls, cleaning the indoor grills is time consuming, as they are difficult to clean. Furthermore, these prior art indoor grills are difficult to use because of the complex controls.

The present invention addresses these limitations in the prior art.

SUMMARY OF THE INVENTION

Embodiments of the present invention are directed to an indoor range-top grill.

In one aspect, a grill comprises a grill enclosure housing a removable burner shield, a removable cone, and a removable grate. The removable cone is configured to be positioned above the burner shield, and the removable grate is configured to be positioned above the removable cone. The grill enclosure is positioned on a burner of a stove during grilling and/or cooking. Typically, the grill enclosure comprises an opening at a top and a hole at a bottom. The hole allows heat and/or flame from the burner through to heat the removable burner shield. Thermal energy radiating from the removable burner shield thereby heats the removable cone. The grill enclosure also has a plurality of handles mounted to an exterior portion of the grill enclosure. In some embodiments, the grill further includes a plurality of removable grip coverings for coupling to the plurality of handles. Typically, the plurality of removable grip coverings is heat-resistant.

In some embodiments, the removable burner shield comprises a heat director integrally coupled to a grease ring. Preferably, the heat director radiates thermal energy and is configured to heat the removable grate. The heat director has a plurality of openings covered by a plurality of raised flaps. In some embodiments, the heat director having the plurality of openings and the plurality of raised flaps is formed in a single stamping operation on sheet metal. The plurality of openings allows heat and/or flame from the burner to pass through the plurality of openings, while the plurality of raised flaps prevents food residue from falling through the plurality of openings. Typically, the heat director is able to burn grease, which thereby adds true BBQ taste/flavor to the food. The grill in allows for small fires when grease hits the heat director. Preferably, the grease ring slopes down at an angle, guiding food residue, including liquid food residue such as grease, away from the hole located at the bottom of the grill enclosure. As such, the food residue is trapped between the grease ring and the grill enclosure. The grill prevents larger fires by trapping excess grease between the grease ring and the grill enclosure.

In other embodiments, the removable grate is a heavy-duty grate. Yet, in other embodiments, the removable grate is a tiered grate. Typically, the removable grate is positioned above the removable cone and removable burner shield in the grill enclosure.

In further embodiments, the grill further includes a separator. The grill enclosure is positioned on the separator when in use, thereby preventing the grill enclosure from directly contacting the surface of the stove. The separator in some embodiments includes a substantially planar base having a plurality of apertures therethrough and a plurality of finned legs coupled thereon. Typically, the plurality of finned legs surrounds the plurality of apertures.

Yet, in further embodiments, the grill further includes a lid having one or more vents. Each of the one or more vents is able to adjustably and selectively open and close. Preferably, the grill enclosure, the lid, the removable burner shield, the removable cone, the removable grate, and the separator are porcelain coated and are able to be cleaned in a self-cleaning oven and/or in an automatic dishwasher.

In another aspect, an indoor apparatus for substantially duplicating outdoor grilling comprises a grill enclosure having an opening at a top and a hole at a bottom, a burner shield configured to removably position inside the grill enclosure on a raised lip around the circumference of the hole, a cone configured to removably position inside the grill enclosure above the burner shield, and a separator having a plurality of apertures. The separator is configured to support the grill enclosure thereon such that the hole of the grill enclosure is substantially above the plurality of apertures. Typically, the grill enclosure has one or more handles mounted to an outer portion of the grill enclosure. In some embodiments, the indoor apparatus further includes one or more removable grip coverings. The one or more removable grip coverings are able to protect hands from burns. As such, the one or more removable grip coverings are typically heat-resistant. The grill enclosure also has a ledge integrally coupled to an inner portion of the grill enclosure to support the grate. In some embodiments, the raised lip around the circumference of the hole creates a channel at the bottom of the grill enclosure. Typically, the channel is able to collect food residue. The raised lip is able to support the burner shield.

In some embodiments, the burner shield includes a heat director and a grease ring. Typically, the heat director and the grease ring are integrally coupled. The hole allows heat and flame from a burner through to heat the heat director. Preferably, the heat director radiates thermal energy and is configured to heat the cone. The heat director in some embodiments is configured in a dome shape and has a plurality of openings and a plurality of raised flaps. Typically, the plurality raised flaps covers the plurality of openings. The plurality of openings allows for heat and flame from a burner to pass through the plurality of openings, while the plurality of raised flaps prevents food residue from falling through the plurality of openings. In some embodiments, the heat director having the plurality of openings and the plurality of raised flaps is formed in a single stamping operation on sheet metal. Typically, the heat director is able to burn grease, which thereby adds true BBQ taste/flavor to the food. The indoor apparatus allows for small fires when grease hits the heat director. Preferably, the grease ring has an outer diameter and an inner diameter. Typically, the outer diameter is larger than a diameter of the hole and the inner diameter is not larger than a diameter of the heat director. Typically, the grease ring guides food residue away from the hole. In some embodiments, the grease ring slopes down to allow food residue to run down the grease ring toward a channel located at the bottom of the grill enclosure. As such, the food residue is trapped between the grease ring and the grill enclosure. The indoor apparatus prevents larger fires from grease trapped between the grease ring and the grill enclosure. In some embodiments, the diameter of the cone is smaller than the diameter of the portion of the grill enclosure where the cone is horizontally positioned at. In some embodiments, the separator comprises a plurality of finned legs, wherein a portion of the plurality of finned legs abuts the exterior surface of the raised lip.

In other embodiments, the grill further includes a grate and a lid. The grate is a heavy-duty grate. The lid has at least one vent. The at least one vent is able to adjustably and selectively open and close. Preferably, the grill enclosure, the lid, the burner shield, and the grate are porcelain coated and are able to be cleaned in a self-cleaning oven and/or in an automatic dishwasher.

Yet in another aspect, a grill comprises a grill enclosure, a burner shield and a separator. The grill enclosure has a top opening adapted to receive a grate and a bottom opening. In some embodiments, the bottom opening includes an inward and upward facing lip. The burner shield is sized to substantially cover the bottom opening and fit within the lip. In other embodiments, the burner shield includes at least one raised flap. The separator is configured to support the grill enclosure thereon. The separator has a plurality of finned legs configured to abut the exterior surface of the lip of the bottom opening. In some embodiments, the fin portion of each finned leg is angled to correspond to the angle of the lip of the bottom opening. In some embodiments, the grill further comprises a cone. The cone is positioned above the burner shield within the grill enclosure. Heat through the at least one raised flap heats the cone. In some embodiments, the cone is configured to vaporize liquid.

DETAILED DESCRIPTION OF THE INVENTION

In the following description, numerous details are set forth for purposes of explanation. However, one of ordinary skill in the art will realize that the invention may be practiced without the use of these specific details or with equivalent alternatives.

Reference will now be made in detail to implementations of the present invention as illustrated in the accompanying drawings. The same reference indicators will be used throughout the drawings and the following detailed description to refer to the same or like parts.

Embodiments of the present invention are directed to an indoor range-top grill. The indoor range-top grill is a device that allows a user to substantially duplicate outdoor grilling indoors. In some embodiments, the indoor range-top grill sits on top of a gas or electric burner of a stove and uses heat from the burner to grill and cook food. As such, the indoor range-top grill lacks electronic components such as electric cords and controls, allowing the indoor range-top grill to be easily used and cleaned.

Figure 1:
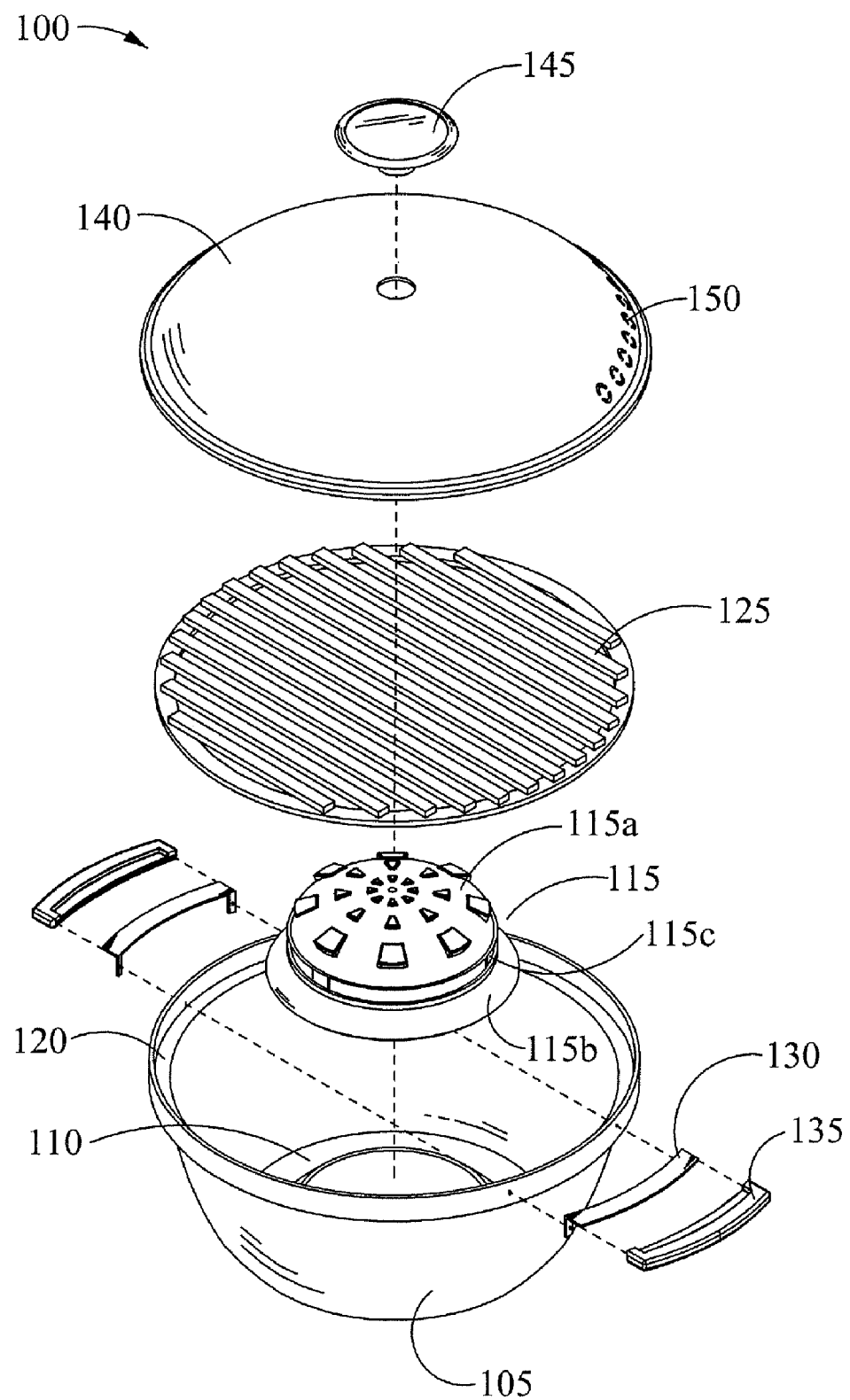
FIG. 1 illustrates an exploded view of an indoor range-top grill in accordance with the present invention and its various components.

FIG. 1 illustrates an exploded view of the indoor range-top grill 100 in accordance with the present invention and its various components. The indoor range-top grill 100 preferably comprises a grill enclosure 105. In some embodiments, the grill enclosure 105 is hyperbolic in shape. However, other shapes of the grill enclosure 105 are possible. The grill enclosure 105 typically comprises an opening at a top of the grill enclosure 105 and a hole at a bottom of the grill enclosure 105. In some embodiments, the hole is circular in shape and is smaller than a bottom surface of the grill enclosure 105. The hole at the bottom of the grill enclosure has a raised lip or edge 110 around its circumference, creating a channel at the bottom of the grill enclosure 105. Typically, the channel is for collecting food residue such as particles, liquids and grease. The raised lip 110 is configured to support a burner shield 115. The burner shield 115 is described in detail below.

Preferably, the grill enclosure 105 comprises a ledge 120 integrally coupled around an inner or interior portion of the grill enclosure 105. In some embodiments, the inner portion is located near the top of the grill enclosure 105. Typically, the ledge 120 is configured to support a grate 125. The grate 125 is described in detail below.

Preferably, the grill enclosure 105 also comprises one or more handles 130 mounted to an outer or exterior portion of the grill enclosure 105. In some embodiments, the outer portion is located near the top of the grill enclosure 105. Typically, the one or more handles 130 are mounted to the grill enclosure 105 using weldments or fastening hardware. Alternatively, the one or more handles 130 and the grill enclosure 105 are integrally formed. In other embodiments, the indoor range-top grill 100 comprises one or more removable grip coverings 135. Typically, a removable grip covering 135 is configured to cover each of the handles 130. Preferably, the removable grip covering 135 is heat-resistant. As such, the removable grip covering 135 is able to protect hands from potential burns when the one or more handles 130 are hot to touch. In addition, the removable grip covering 135 provides the user with a solid grip when the user holds on to and/or carries the indoor range-top grill 100.

The indoor range-top grill 100 comprises a lid 140. Typically, the lid 140 has a knob 145 for lifting the lid 140. Typically, the knob 145 is detachably coupled to the lid 140 using fastening hardware such as screws and washers. Alternatively, the knob 145 and the lid 140 are integrally formed. In other embodiments, the lid 140 has a handle bar for lifting the lid 140. Preferably, the lid 140 comprises one or more vents 150 to allow ventilation and/or combustion of flame from the burner of the stove. The one or more vents 150 in some embodiments are configured to adjustably and selectively open and close. Preferably, the lid 140 is configured in a dome shape. However, one skilled in the art appreciates that the lid 140 is alternatively configured in any number of shapes and sizes, depending upon application.

In some embodiments, the burner shield 115 comprises a heat director 115a, a grease ring 115b, and a plurality of vertical supports 115c. Typically, the heat director 115a is integrally coupled to the plurality of vertical supports 115c, which in turn is integrally coupled to the grease ring 115b. The heat director 115a is typically configured in a dome shape, although other shapes, such as a flat square surface, are possible. In some embodiments, the heat director 115a has a plurality of openings covered by a plurality of raised flaps. The plurality of openings allows heat and/or flame from the burner of the stove to pass through the plurality of openings, while the plurality of raised flaps prevents food residue from falling through the plurality of openings. Typically, the dome shape of the heat director 115a allows the food residue to run down the heat director 115a to the grease ring 115b below. Voids between each of the vertical supports 155c and between the heat director 115a and the grease ring 115b also allow heat and/or flame from the burner of the stove to pass through. In some embodiments, the heat director 115a, including the plurality of openings and the plurality of flaps, is formed in a single stamping operation on sheet metal.

To ensure that the grease ring 115b catches the food residue fallen heat director 115a, an outer diameter of the grease ring 115b is preferably smaller than the diameter of the bottom of the grill enclosure 105 but larger than the diameter of the hole, and an inner diameter of the grease ring 115b is preferably not larger than a diameter of the heat director 115a. In some embodiments, the grease ring 115b slopes down at a slight angle such that the food residue runs down from the grease ring 115b toward the channel located at the bottom of the grill enclosure 105.

As discussed above, the burner shield 115 is typically positioned on the raised lip 110 and above the bottom of the grill enclosure 105. It will be apparent to those of ordinary skill in the art that a variety of the burner shield 115 could be alternatively configured while remaining within the spirit and scope of the present invention.

In some embodiments, the grate 125 is a heavy-duty grate. The grate 125 in some embodiments has a nonstick surface. Preferably, the grate 125 is similarly shaped and sized as the ledge 120 and, thus, is able to be positioned on the ledge 120. In some embodiments, a diameter of the grate 125 and an outer diameter of the ledge 120 are equivalent in value. Typically, the grate 125 is positioned directly above the burner shield 115. Preferably, the grate 125 and the burner shield 115 do not touch. In some embodiments, the grate 125 is tiered (not shown). Food to be grilled and/or cooked is placed on the grate 125.

Preferably, the hole at the bottom of the grill enclosure 105 is sized the same as the burner of the stove. Alternatively, the hole is sized smaller but is large enough such that the bottom of the grill enclosure 105 does not cover up a majority of the burner's surface in order to allow sufficient heat and/or flame from the burner through the hole. The heat and/or flame then passes through the voids and plurality of openings, as described above. Therefore, the hole at the bottom of the grill enclosure 105 allows the heat and/or flame to heat the heat director 115a. As the heat director 115a gets hot, the heat director 115a radiates thermal energy which in turn heats the grate 125 positioned directly above the burner shield 115, thereby grilling and cooking the food that is on the grate 125. Grease from the food, such as meat, drips onto the heat director 115a. Preferably, when grease hits the heat director 115a, the grease burns, which thereby adds true BBQ taste/flavor to the meat. In some embodiments, the indoor range-top grill 100 allows for small fires when the grease hits the heat director 115a.

As detailed above, the heat director 115a is integrally coupled to the plurality of vertical supports 115c, which in turn is integrally coupled to the grease ring 115b. Typically, the heat director 115a and the grease ring 115b function differently. The heat director 115a is configured such that the food residue, including excess grease that had not been burned on the heat director 115a, runs down past the plurality of raised flaps covering the plurality of openings to the grease ring 115b below. The grease ring 115b then guides the food residue away from the hole toward the channel to prevent the excess grease, for example, from catching on fire. Specifically, the excess grease is advantageously trapped in the channel under the grease ring 115b. Since the excess grease is trapped in the channel under the grease ring 115b, the excess grease is less likely to catch on fire because the excess grease is not able to reach the burner. Accordingly, the indoor range-top grill 100 of the present invention prevents the potential of larger fires from the excess grease in the channel, because the excess grease is trapped between the grease ring 115b and the grill enclosure 105.

Figure 2A:
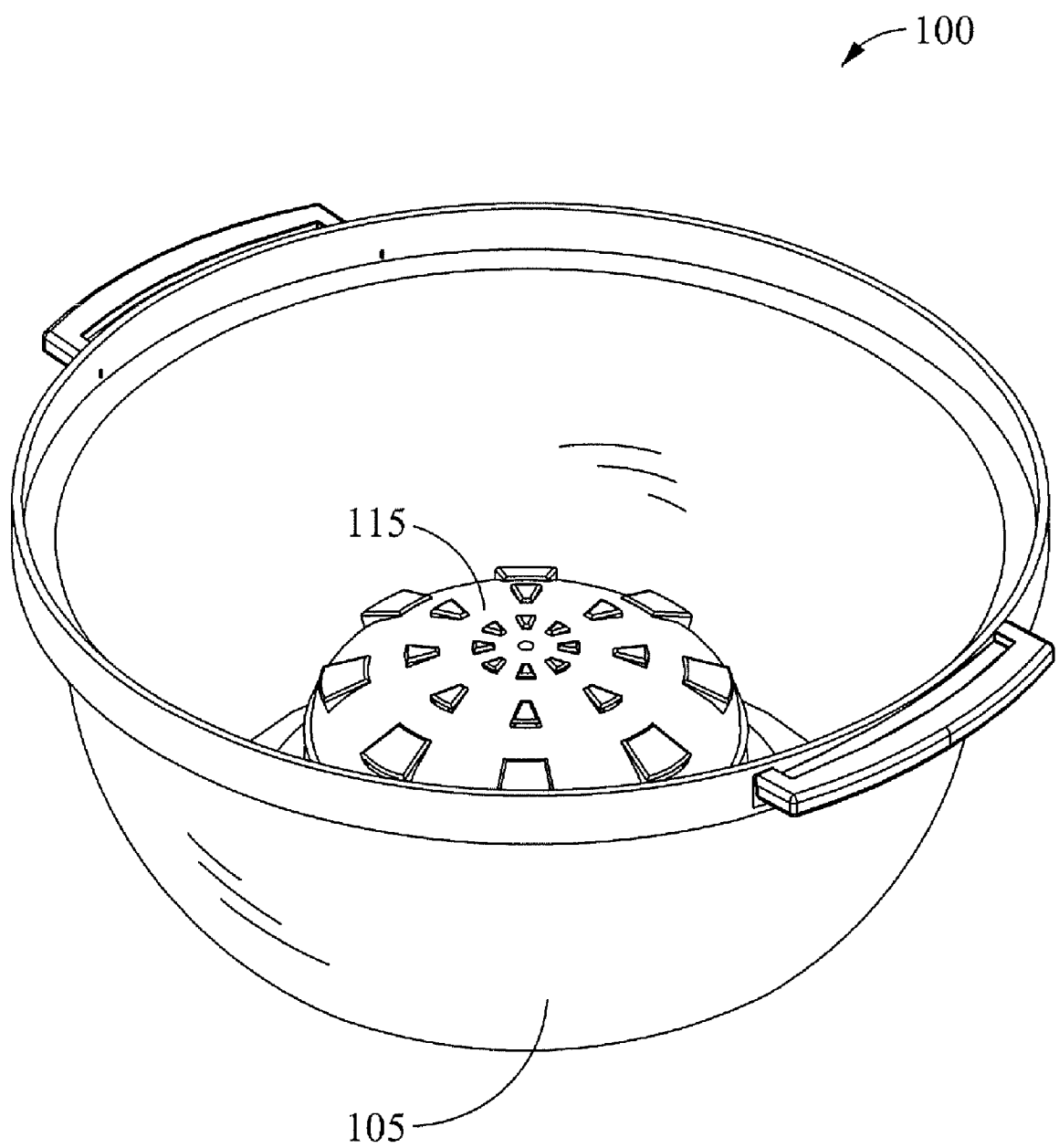
FIGS. 2A-2C illustrate a process of assembling the indoor range-top grill in accordance with the present invention.
Figure 2B:
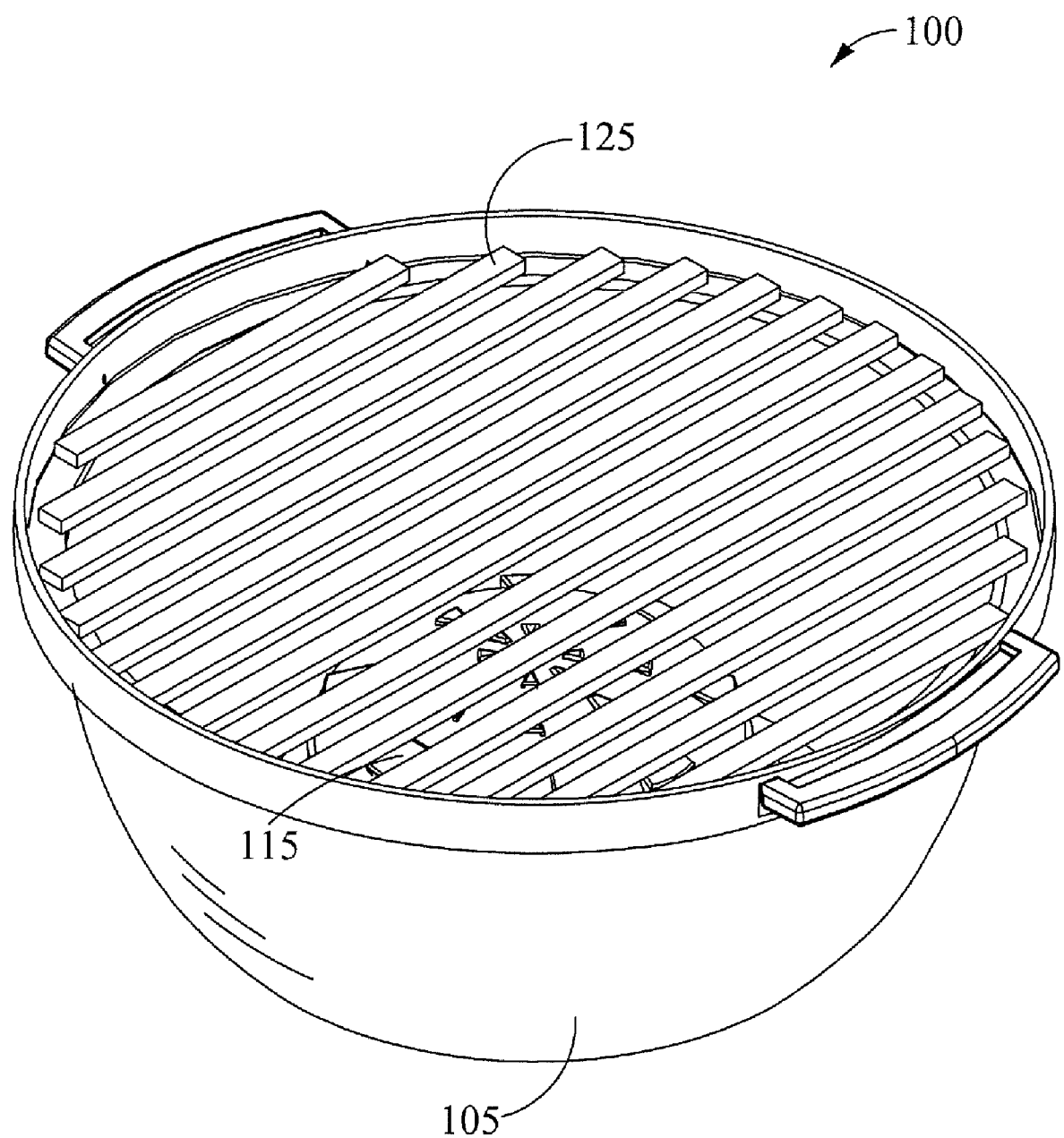
Figure 2C:
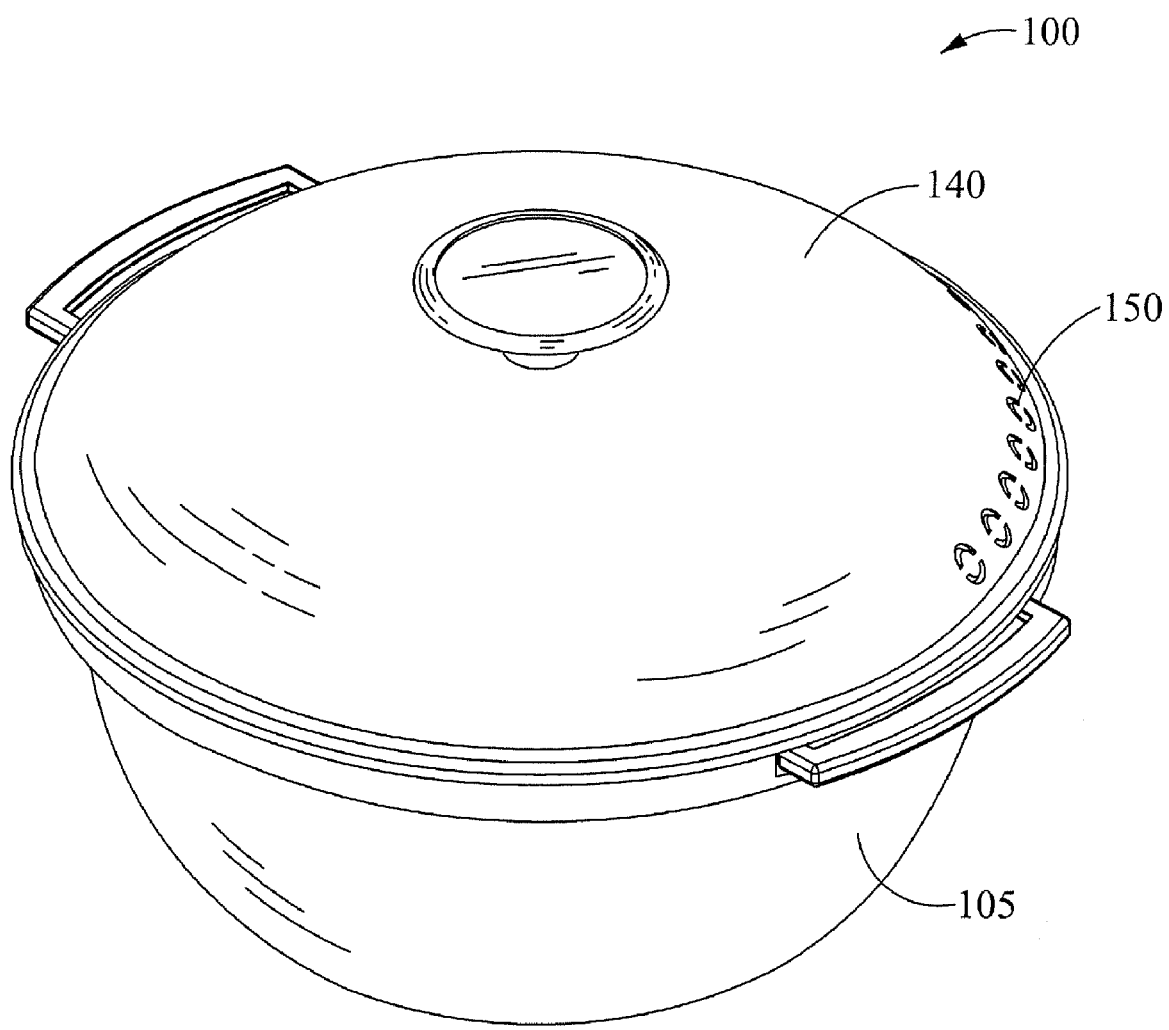

FIGS. 2A-2C illustrate a process of assembling the indoor range-top grill 100 in accordance with the present invention. To assemble the indoor range-top grill 100, the user first places the burner shield 115 inside the grill enclosure 105 on the raised lip 110, as illustrated in FIG. 2A. The raised lip 110 is configured to support the burner shield 115. Next, the user places the grate 125 on the ledge 120, as illustrated in FIG. 2B. The ledge 120 is configured to support the grate 125. The grill enclosure 105 with the burner shield 115 and the grate 125 inside the grill enclosure 105 is placed over the burner of the stove. Alternatively, the grill enclosure 105 is placed over the burner of the stove before the burner shield 115 and/or the grate 125 are placed inside the grill enclosure 105. The user is able to optionally place the lid 140 on the grill enclosure 105 during cooking and/or grilling, as illustrated in FIG. 2C. The user is also able to adjustably and selectively cover one, some or all of the one or more vents 150.

Figure 3A:
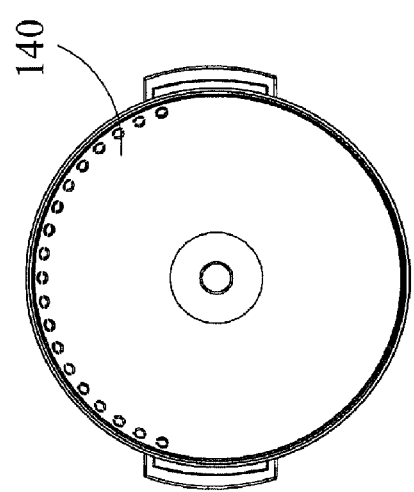
FIGS. 3A-3F illustrates different views of the assembled range-top grill in accordance with the present invention.
Figure 3B:
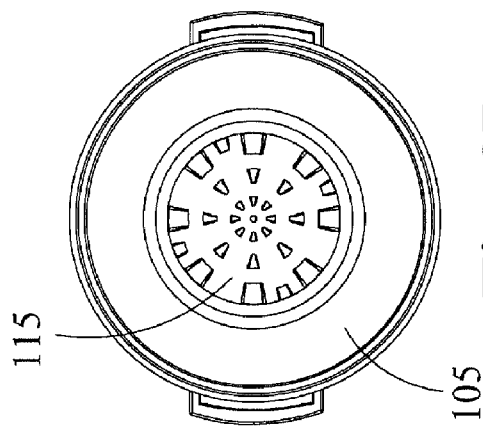
Figure 3C:
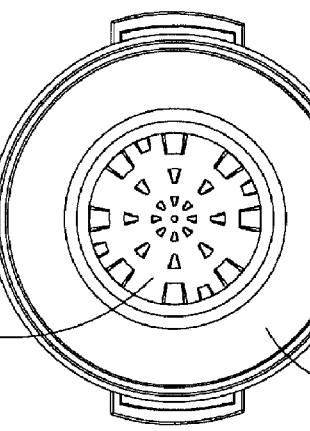
Figure 3D:
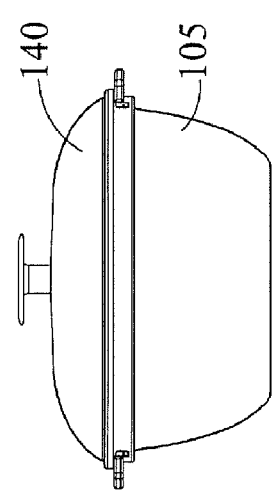
Figure 3E:
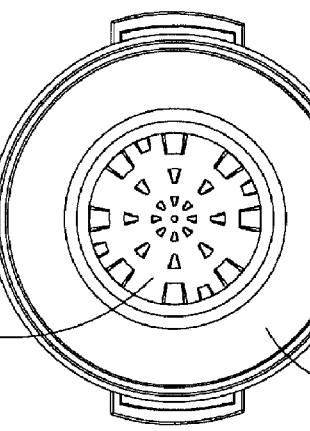
Figure 3F:
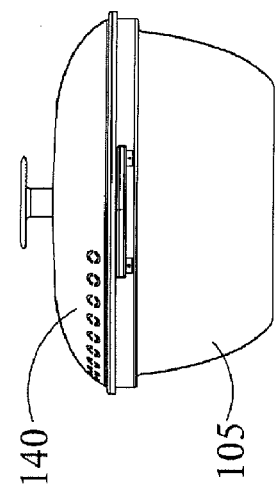
Figure 4:
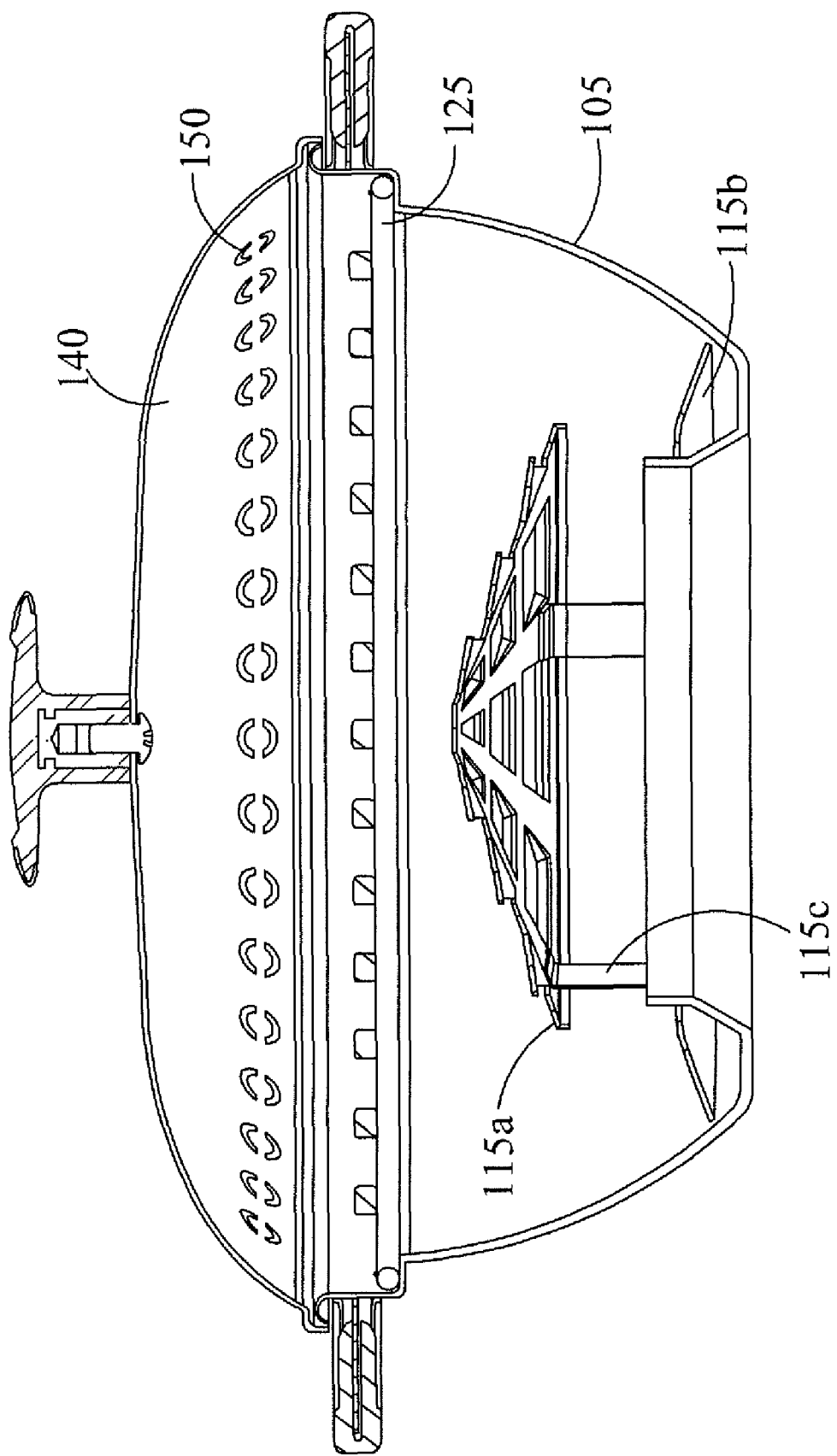
FIG. 4 illustrates a transparent view of a first side of the assembled range-top grill in accordance with the present invention.

FIGS. 3A-3F illustrates different views of an assembled range-top grill 100 in accordance with the present invention. FIG. 3A illustrates a top view of the assembled range-top grill 100. The lid 140 completely obscures the burner shield 115 and the grate 125 that are positioned inside the indoor range-top grill 100. FIG. 3B illustrates a bottom view of the assembled range-top grill 100. A partial view of the burner shield 115 is seen through the hole located at the bottom of the grill enclosure 105. FIG. 3C illustrates a first side view of the assembled range-top grill 100. FIG. 3D illustrates a second side view of the assembled range-top grill 100. FIG. 3E illustrates a third side view of the assembled range-top grill 100. FIG. 3F illustrates a fourth side view of the assembled range-top grill 100. FIG. 4 illustrates a transparent view of the first side of the assembled range-top grill 100.

Optional Accessories

Figure 5A:
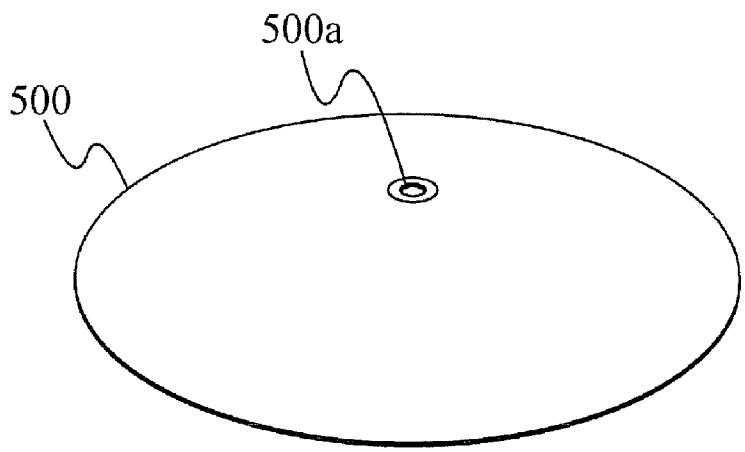
FIG. 5A illustrates a removable cone in accordance with the present invention.
Figure 5B:
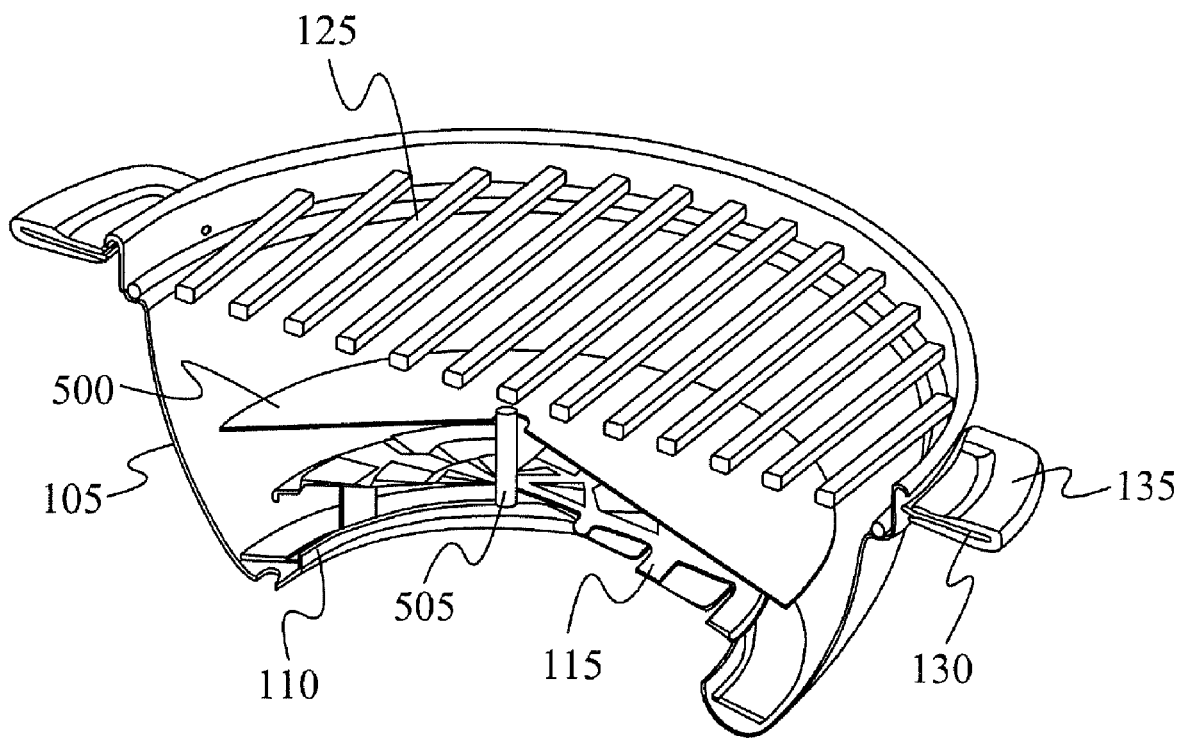
FIG. 5B illustrates a perspective, cross sectional view of the assembled indoor-range top grill with the removable cone.

Removable Cone. FIG. 5A illustrates a removable cone 500 in accordance with the present invention. The removable cone 500 is configured to be positioned between the grate 125 and the burner shield 115 when the indoor-range top grill 100 is assembled. The removable cone 500 has an opening 500a at the center such that a rod can be inserted therethrough to be coupled to the burner shield 115. The rod positions and securely maintains the removable cone 500 at a first distance above the burner shield 115 and a second distance below the grate 125. FIG. 5B illustrates a perspective, cross sectional view of the assembled indoor-range top grill 100 with the removable cone 500 but sans the lid 140. As illustrated, the rod 505 is inserted through the hole 500a of the cone 500 and is fastened to the burner shield 115 such that the cone 500 is substantially horizontally positioned between the burner shield 115 and the grate 125. Heat and/or flame that passes through the voids and openings of the burner shield 115 heat the removable cone 500. As the removable cone 500 gets hot, the removable cone 500 radiates thermal energy which in turn heats the grate 125 positioned directly above the removable cone 500, thereby grilling and cooking the food on the grate 125. Although the removable cone 500 is heated by radiation from the burner shield 115, the removable cone 500 is able to vaporize liquid dripped down from the food above. However, the amount of burning (e.g., of grease) on the removable cone 500 is decreased and, thus, the amount of smoke that the indoor grill 100 outputs when in use are significantly reduced.

The removable cone 500 is typically pitched at the center and has a relatively smooth surface. In some embodiments, the diameter of the removable cone 500 is smaller than the diameter of the portion of grill enclosure 105 where the removable cone 500 is horizontally positioned at such that food residue, including grease that not burned on the removable cone 500, runs down to the grease ring 115b below.

The removable cone 500 is an optional piece; the indoor grill 100 is functional without one. The removable cone 500 advantageously reduces the amount of smoke and the amount of smoke the indoor grill 100 outputs when the removable cone 500 is used with the indoor grill 100. When the indoor grill 100 is in use without one, the indoor grill 100 creates more "BBQ action."

Figure 6:
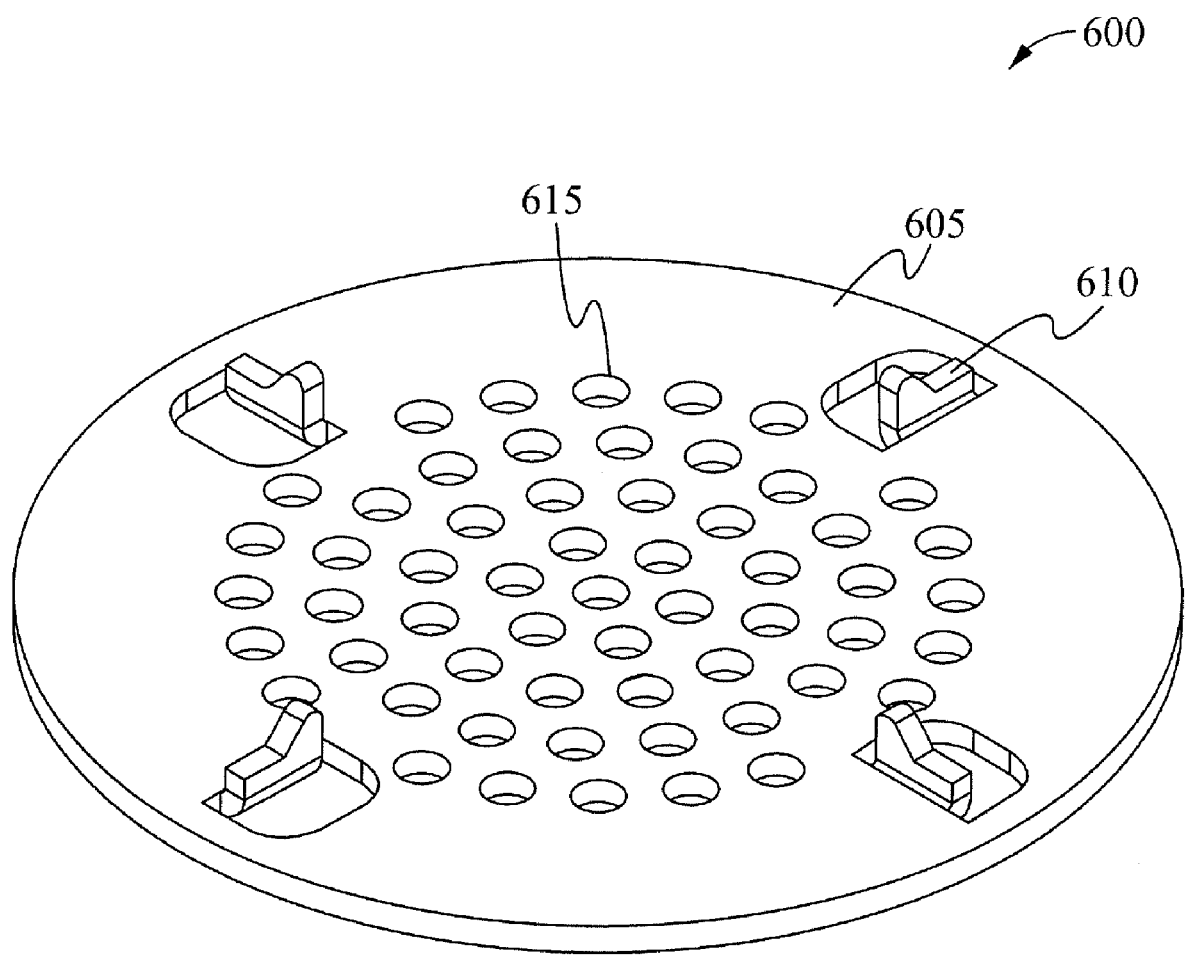
FIG. 6 illustrates a separator in accordance with the present invention.

Separator. FIG. 6 illustrates a separator 600 in accordance with the present invention. The separator 600 is configured to be used with the indoor range-top grill 100, particularly when the indoor range-top grill 100 is heated on a glass or a ceramic top stove. The separator 600 prevents the indoor range-top grill 100 from directly contacting the surface of the top stove. The separator 600 thus advantageously prevents the surface of the top stove from cracking and/or scratching when the indoor range-top grill 100 is in use. The separator 600 preferably has a planar contacting surface for contacting the surface of the top stove.

Although other shapes are possible depending on the structure of the grill enclosure 105, the separator 600 in FIG. 6 comprises a planar circular-shaped base 605, which has a diameter at least the size of that of the bottom surface of the grill enclosure 105 and at least a thickness that prevents the base 605 from warping when heated. Preferably, the base 605 is flat-bottomed to prevent damaging the surface of the top stove. A portion of the base 605 has a plurality of apertures 615. In some embodiments, the portion is circular in shape and the dimensions of the portion correspond to the hole at the bottom of the grill enclosure 105. The top surface of the separator 600 has a plurality of finned legs 610 coupled thereto. In FIG. 6, four finned legs 610 are equidistantly spaced around the plurality of apertures 615. In some embodiments, the finned legs 610 are attached to the top surface of the base 605 using weldments. Alternatively, the finned legs 610 are integrally formed with the base 605.

The finned legs 610 support the indoor range-top grill 100 during use at a distance above the surface of the top stove. When the indoor range-top grill 100 is positioned on the separator 600, the fins 610a of the legs 610 abut against the exterior surface of the raised lip 110 to prevent the indoor range-top grill 100 from moving or sliding, for example, off the separator 600, and the hole of the grill enclosure 105 is substantially over and covers the plurality of apertures 615. The plurality of apertures 615 allows for heat from the burner through to pass through the voids and plurality of openings, as described above. The base 605 is thus substantially positioned around the burner.

Figure 7:
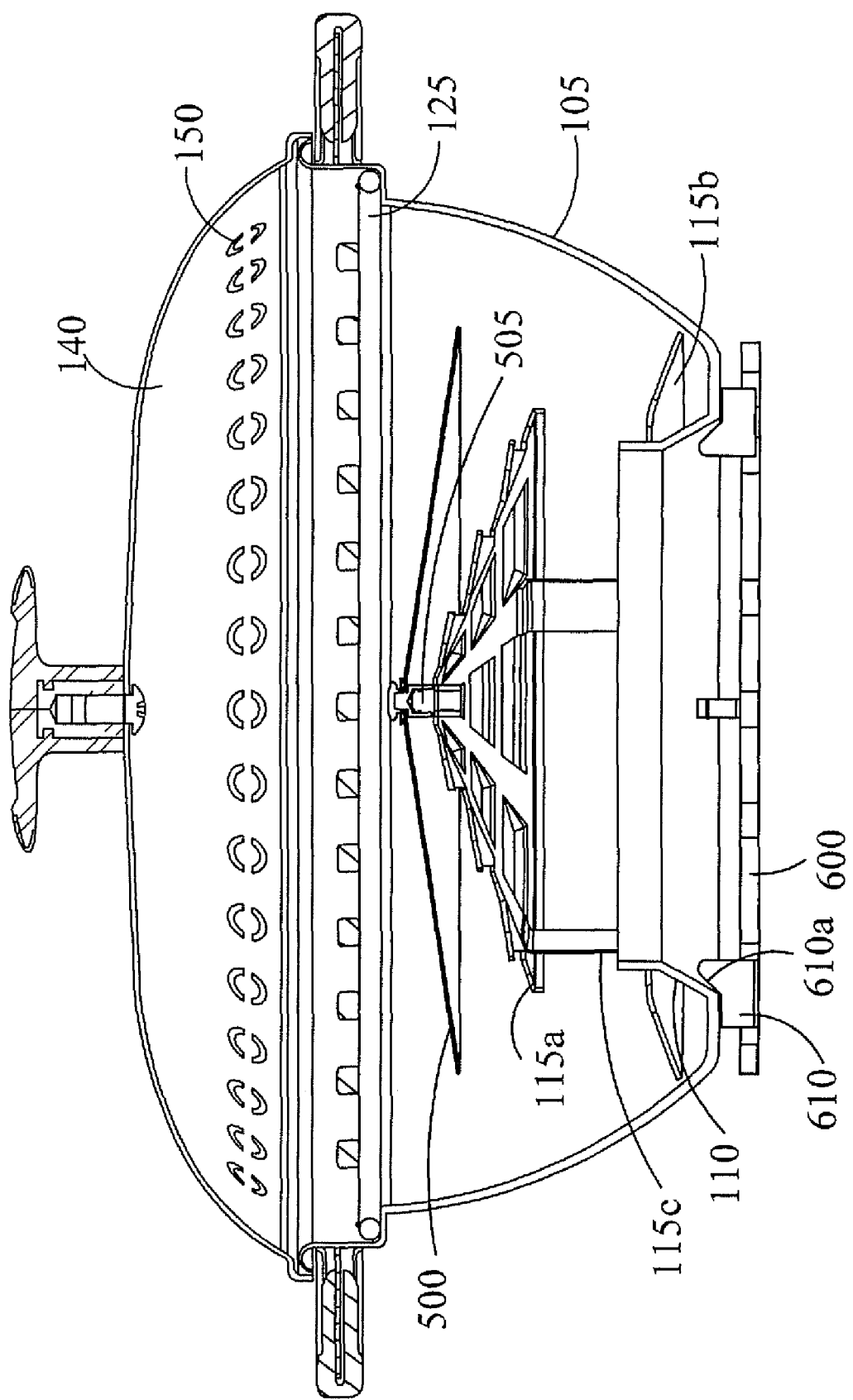
FIG. 7 illustrates a transparent view of a first side of the assembled range-top grill with the removable cone and the separator in accordance with the present invention.

FIG. 7 illustrates a transparent view of a first side of the assembled range-top grill 100 with the additional accessories, the removable cone 500 and the separator 600. As illustrated, the removable cone 500 is positioned between the grate 125 and the burner shield 115. The range-top grill 100 is positioned on the separator 600 such that the fins 610a of the legs 610 abut against the exterior surface of the raised lip 110 to prevent the indoor range-top grill 100 from moving or sliding, for example, off the separator 600. The hole at the bottom of the grill enclosure 105 is positioned above the plurality of apertures 615. The separator 600 prevents the indoor range-top grill 100 from directly contacting the surface of the top stove.

In some embodiments, the grill enclosure 105 and the lid 140 are porcelain coated. In other embodiments, the burner shield 115, the cone 500, the grate 125, and the separator 600 are also porcelain coated. As mentioned above, the indoor range-top grill 100 does not have any electronic components. Accordingly, the indoor range-top grill 100 is easy to use. Furthermore, these parts are easy to be cleaned, such as in a self-cleaning oven at typically 700°-800° F. or in an automatic dishwasher. Typically, the removable handles 135 are removed prior to the grill enclosure 105 being cleaned in the self-cleaning oven.

The present invention has been described in terms of specific embodiments incorporating details to facilitate the understanding of principles of construction and operation of the invention. Such reference herein to specific embodiments and details thereof is not intended to limit the scope of the claims appended hereto. A person skilled in the art would appreciate that various modifications and revisions to the indoor range-top grill. Consequently, the claims should be broadly construed, consistent with the spirit and scope of the invention, and should not be limited to their exact, literal meaning.

We claim:

1. A grill comprising a grill enclosure housing a removable burner shield, a removable cone configured to be positioned above the burner shield, a removable grate configured to be positioned above the removable cone, wherein thermal energy radiating from the removable burner shield heats the removable cone, and a separator comprising a substantially planar base having a plurality of apertures therethrough and a plurality of finned legs coupled thereon, wherein the plurality of finned legs surrounds the plurality of apertures and the grill enclosure is positioned on the separator when in use, thereby preventing the grill enclosure from directly contacting the surface of a stove.

2. The grill of claim 1 wherein the grill enclosure comprises a plurality of handles mounted to an exterior portion of the grill enclosure, an opening at a top, and a hole at a bottom, wherein the hole allows heat and/or flame from a burner through to heat the removable burner shield.

3. The grill of claim 1 wherein the removable burner shield comprises a heat director integrally coupled to a grease ring, the heat director configured to burn grease.

4. The grill of claim 3 wherein the heat director radiates thermal energy towards the removable cone.

5. The grill of claim 3 wherein the heat director has a plurality of openings covered by a plurality of raised flaps, wherein the plurality of openings is configured to allow heat and/or flame from a burner to pass through the plurality of openings, and wherein the plurality of raised flaps is configured to prevent food residue from falling through the plurality of openings.

6. The grill of claim 3 wherein the grease ring slopes down at an angle to guide food residue away from a hole located at a bottom of the grill enclosure, wherein the food residue is trapped between the grease ring and the grill enclosure.

7. The grill of claim 6 wherein the grill is configured to allow for small fires when grease hits the heat director and to prevent larger fires by trapping excess grease between the grease ring and the grill enclosure.

8. The grill of claim 1 further comprising a lid having one or more vents.

9. An indoor apparatus for substantially duplicating outdoor grilling comprising:
   a. a grill enclosure having an opening at a top and a hole at a bottom;
   b. a burner shield configured to removably position inside the grill enclosure on a raised lip around the circumference of the hole;
   c. a cone configured to removably position inside the grill enclosure above the burner shield; and
   d. a separator having a plurality of apertures, wherein the separator is configured to support the grill enclosure thereon such that the hole of the grill enclosure is substantially above the plurality of apertures, the separator further comprises a plurality of finned legs, and a portion of the plurality of finned legs abuts the exterior surface of the raised lip.

10. The indoor apparatus of claim 9 wherein the grill enclosure comprises one or more handles mounted to an outer portion of the grill enclosure, and a ledge integrally coupled to an inner portion of the grill enclosure.

11. The indoor apparatus of claim 9 wherein the raised lip around the circumference of the hole creates a channel at the bottom of the grill enclosure, wherein the channel is configured to collect food residue, and wherein the raised lip is configured to support the burner shield.

12. The indoor apparatus of claim 9 wherein the burner shield comprises a heat director and a grease ring, wherein the heat director and the grease ring are integrally coupled.

13. The indoor apparatus of claim 12 wherein the hole allows heat and/or flame from a burner through to heat the heat director, wherein the heat director radiates thermal energy and is configured to heat the cone.

14. The indoor apparatus of claim 12 wherein the heat director is configured in a dome shape.

15. The indoor apparatus of claim 12 wherein the heat director has a plurality of openings and a plurality of raised flaps, the plurality raised flaps covers the plurality of openings.

16. The indoor apparatus of claim 15 wherein the plurality of openings is configured to allow heat and flame from a burner to pass through the plurality of openings, wherein the plurality of raised flaps is configured to prevent food residue from falling through the plurality of openings.

17. The indoor apparatus of claim 12 wherein the grease ring comprises an outer diameter and an inner diameter, the outer diameter is larger than a diameter of the hole, the inner diameter is not larger than a diameter of the heat director.

18. The indoor apparatus of claim 12 wherein the grease ring is configured to guide food residue toward a channel located at the bottom of the grill enclosure and away from the hole, wherein the food residue is trapped between the grease ring and the grill enclosure.

19. The indoor apparatus of claim 9 wherein the diameter of the cone is smaller than the diameter of the portion of grill enclosure where the cone is horizontally positioned at.

20. The indoor apparatus of claim 9 further comprising a grate, and a lid having at least one vent.

21. A grill comprising:
   a. a grill enclosure having:
      i. a top opening adapted to receive a grate; and
      ii. a bottom opening, wherein the bottom opening includes an inward and upward facing lip;
   b. a burner shield, wherein the burner shield is sized to substantially cover the bottom opening and fit within the lip, and further wherein the burner shield includes at least one raise flap; and
   c. a separator configured to secure the grill enclosure thereon, wherein the separator has a plurality of finned legs configured to abut the exterior surface of the lip of the bottom opening, and wherein the fin portion of each finned leg is angled corresponding to the angle of the lip of the bottom opening.

22. The grill of claim 21, further comprising a cone configured to be positioned above the burner shield, wherein heat through the at least one raised flap heats the cone.

* * * * *